United States Patent [19]
Dinsmore

[11] Patent Number: 5,345,771
[45] Date of Patent: Sep. 13, 1994

[54] PROCESS FOR RECOVERING CONDENSABLE COMPOUNDS FROM INERT GAS-CONDENSABLE COMPOUND VAPOR MIXTURES

[75] Inventor: Harold L. Dinsmore, Tulsa, Okla.

[73] Assignee: John Zink Company, A Division of Koch Engineering Company, Inc., Tulsa, Okla.

[21] Appl. No.: 36,725

[22] Filed: Mar. 25, 1993

[51] Int. Cl.⁵ .................................. F25J 3/00
[52] U.S. Cl. ........................... 62/18; 62/23; 95/93; 95/97; 96/122; 96/130
[58] Field of Search ............ 62/18, 23; 95/92, 93, 95/97, 103, 146; 96/122, 130

[56] References Cited

U.S. PATENT DOCUMENTS

| | | | |
|---|---|---|---|
| 4,276,058 | 6/1981 | Dinsmore | 55/48 |
| 4,282,013 | 8/1981 | Franklin et al. | 55/48 |
| 4,301,298 | 11/1981 | Horlenko et al. | 560/218 |
| 4,359,313 | 11/1982 | Bernard | 417/68 |
| 4,657,487 | 4/1987 | Schönwald et al. | 417/68 |
| 4,755,107 | 7/1988 | Trimborn | 417/68 |
| 5,154,735 | 10/1992 | Dinsmore et al. | 55/25 |
| 5,156,657 | 10/1992 | Jain et al. | 62/18 |
| 5,220,796 | 6/1993 | Kearns | 62/18 |

Primary Examiner—Ronald C. Capossela
Attorney, Agent, or Firm—Dougherty, Hessin, Beavers & Gilbert

[57] ABSTRACT

An improved process for recovering one or more condensable compounds from an inert gas-condensable compound vapor mixture is provided. The inert gas-condensable compound vapor mixture is flowed through a first bed of solid adsorbent whereby the condensable compounds are removed from the mixture and a residue gas stream comprised of substantially condensable compound-free inert gas is produced and disposed of, e.g., vented to the atmosphere. A second bed of solid adsorbent is evacuated by vacuum pumping using a cooled liquid seal vacuum pump. As the resulting inert gas-condensable compound vapor mixture is contacted with the cooled seal liquid of the liquid seal vacuum pump, a major portion of the condensable compounds are condensed. The condensed compounds are recovered and a portion thereof are cooled and recycled as cooled seal liquid for the vacuum pump.

28 Claims, 2 Drawing Sheets

PROCESS FOR RECOVERING CONDENSABLE COMPOUNDS FROM INERT GAS-CONDENSABLE COMPOUND VAPOR MIXTURES

BACKGROUND OF THE INVENTION

1. Field of the Invention

The present invention relates to an improved process for recovering condensable compounds from inert gas-condensable compound vapor mixtures.

2. Description of the Prior Art

In the storage and transfer of liquids formed from condensable compounds, portions of the liquids often vaporize and mix with air or other gas in contact therewith. Such mixtures generally can not be vented directly to the atmosphere due to the resulting pollution of the environment or the creation of a fire or explosion hazard. The vaporized compounds, referred to herein as "condensable compounds" can be produced from multi-compound hydrocarbon liquids such as gasoline and kerosene, single compound hydrocarbon liquids such as benzene and methanol and non-hydrocarbon compounds such as carbon tetrachloride and the like.

A variety of processes have heretofore been developed and used for removing condensable compound vapors from inert gas-condensable compound vapor mixtures whereby the remaining inert gas, e.g., air or nitrogen, can be safely vented to the atmosphere. The removed condensable compounds are generally liquified and recombined with the liquid from which they were vaporized thereby making their recovery economically advantageous.

A commercially successful process and apparatus which has been utilized for recovering both hydrocarbon and non-hydrocarbon condensable compounds from air-condensable compound vapor mixtures is described in U.S. Pat. No. 4,276,058 issued Jun. 30, 1981. In accordance with that process, the air-condensable compound mixture is caused to flow through a bed of solid adsorbent having an affinity for the condensable compounds. As the mixture passes through the bed, a major portion of the condensable compounds contained in the mixture are adsorbed on the bed, and a residue gas stream is produced which is substantially free of condensable compounds and as a result can be vented to the atmosphere. While a first bed of the solid adsorbent is adsorbing condensable compounds from the vapor mixture, a second bed of solid adsorbent having condensable compounds adsorbed thereon is regenerated by evacuation. The evacuation is accomplished by vacuum pumping using a liquid seal vacuum pump in combination with the introduction of a small quantity of heated condensable compound-free air into the solid adsorbent so that additional adsorbed compounds are stripped therefrom. The air-condensable compound vapor mixture produced in the regeneration of the solid adsorbent is contacted with a liquid absorbent so that a major portion of the condensable compounds are absorbed therefrom and recovered.

While various liquids have been utilized in liquid seal vacuum pumps utilized for evacuating beds of solid adsorbent such as oil, water and ethylene glycol solutions, problems have been and are presently experienced as a result of the condensable compounds removed from the solid adsorbent intimately contacting the pump seal liquid. The intimate contact between the condensable compounds and the seal liquid leads to difficulty in separating the recovered condensable compound product from the seal liquid which can in turn cause unexceptable losses of seal liquid, contamination of the recovered condensable compound product or both.

The use of liquid seal vacuum pumps in processes and apparatus of the type described above is highly advantageous in that such pumps are relatively inexpensive, efficient and safe. However, when the condensable compounds to be recovered are completely or partially soluble in the vacuum pump seal liquids that can be used, a process including the use of a liquid seal vacuum pump often can not be utilized. Thus, there is a need for an improved process for recovering condensable compounds from inert gas-condensable compound vapor mixtures which utilizes a liquid seal vacuum pump, but overcomes the problems mentioned above.

SUMMARY OF THE INVENTION

The present invention provides an improved process for recovering condensable compounds from inert gas-condensable compound vapor mixtures which meets the needs described above and overcomes the shortcomings of the prior art.

The process of the invention basically comprises flowing an inlet inert gas-condensable compound vapor mixture through a first bed of solid adsorbent so that the condensable compounds are adsorbed on the bed, and a residue gas stream comprised of substantially condensable compound-free inert gas is vented to the atmosphere or otherwise used or disposed of. A second bed of solid adsorbent having condensable compounds adsorbed thereon is evacuated by subjecting the bed to pumping with a cooled liquid seal vacuum pump. A major portion of the condensable compounds are desorbed from the bed, a condensable compound rich inert gas-condensable compound vapor mixture is produced and a major portion of the condensable compounds in the inert gas-condensable compound vapor mixture is condensed as the vapor mixture is pressurized and contacted with the cooled seal liquid in the liquid seal vacuum pump. A stream of condensed compounds and residue gas comprised of inert gas and a minor portion of condensable compound vapor exit the pump. The condensed compounds and residue gas exiting the pump are separated into separate streams, and the residue gas stream is combined with the inlet inert gas-condensable compound mixture. The condensed compound stream is divided into first and second streams, and the first stream of condensed compounds is passed in heat exchange relationship with a cooling medium so that the first stream of condensed compounds is cooled to a temperature which produces a condensed compound vapor pressure low enough to enable the vacuum pump to evacuate the second bed of solid adsorbent and causes a major portion of the condensable compound vapor to be condensed when the first stream of condensed compound is used as seal liquid for the liquid seal vacuum pump. The cooled first stream of condensed compounds is recycled to the vacuum pump wherein it is utilized as cooled seal liquid therefor. The flow pattern of the inlet inert gas-condensable component vapor mixture and the bed of solid adsorbent being evacuated are periodically changed whereby when the bed through which the inlet inert gas-condensable compound mixture is flowing becomes loaded with adsorbed condensable compounds, the inlet inert gas-condensable compound mixture is caused to flow through the bed which has just been evacuated.

It is, therefore, a general object of the present invention to provide an improved process for recovering condensable compounds from inert gas-condensable compound vapor mixtures.

Other and further objects, features and advantages of the present invention will be readily apparent to those skilled in the art upon a reading of the description of preferred embodiments which follows when taken in conjunction with the accompanying drawings.

DESCRIPTION OF PREFERRED EMBODIMENTS

The improved process of this invention brings about the recovery of condensable compounds from inert gas-condensable compound vapor mixtures whereby a substantially condensable compound-free inert gas stream is produced which can be safely vented to the atmosphere or conducted to another point of disposal or use. The process includes the adsorption of condensable compounds from an inlet inert gas-condensable compound vapor stream on beds of solid adsorbent having an affinity for the condensable compounds. The regeneration of the beds of solid adsorbent is accomplished by evacuation utilizing a cooled liquid seal vacuum pump as the principal pump. Liquid seal vacuum pumps, also known as liquid ring vacuum pumps, are capable of producing high vacuums, are relatively inexpensive, can tolerate liquid slugs and are much safer than other types of vacuum pumps. A liquid seal vacuum pump utilizes a seal liquid which is circulated through the pump. The seal liquid can be confined in a closed circuit, and the presence of the seal liquid in the pump minimizes the possibility of explosions since the gas being pumped can not approach its auto ignition temperature nor can sparking occur due to mechanical failures within the pump. Liquid seal vacuum pumps have heretofore been utilized for evacuating beds of solid adsorbent and they are well known to those skilled in the art. However, prior art processes and apparatus have generally utilized oil, water, aqueous glycol solutions or other seal liquids which are foreign to the condensable compounds being recovered. The intimate contact between the condensable compounds and such foreign vacuum pump seal liquids can cause unexceptable losses of seal liquid and the contamination of recovered condensed compounds.

The term "condensable compounds" is used herein to mean compounds which when in the vapor state, can be condensed at a temperature in the range of from about 0° F. to about 150° F. and a pressure in the range of from about atmospheric to about 25 psig. Examples of such condensable compounds are methanol, benzene, toluene, methyl tertiary butyl ether (MTBE), acetone, carbon tetrachloride, hexane, kerosene, gasoline and the like. The term "inert gas" is used herein to mean a gas or a gas mixture which does not adversely react with the condensable compounds in admixture therewith or with the solid adsorbent used to adsorb the condensable compounds. When the inert gas is atmosphere polluting, the substantially condensable component-free inert gas residue stream produced can be conducted to a location of non-polluting use or disposal. When the inert gas is non-atmosphere polluting, e.g., air or nitrogen, the residue gas stream can be disposed of by venting it to the atmosphere.

Figure 1:
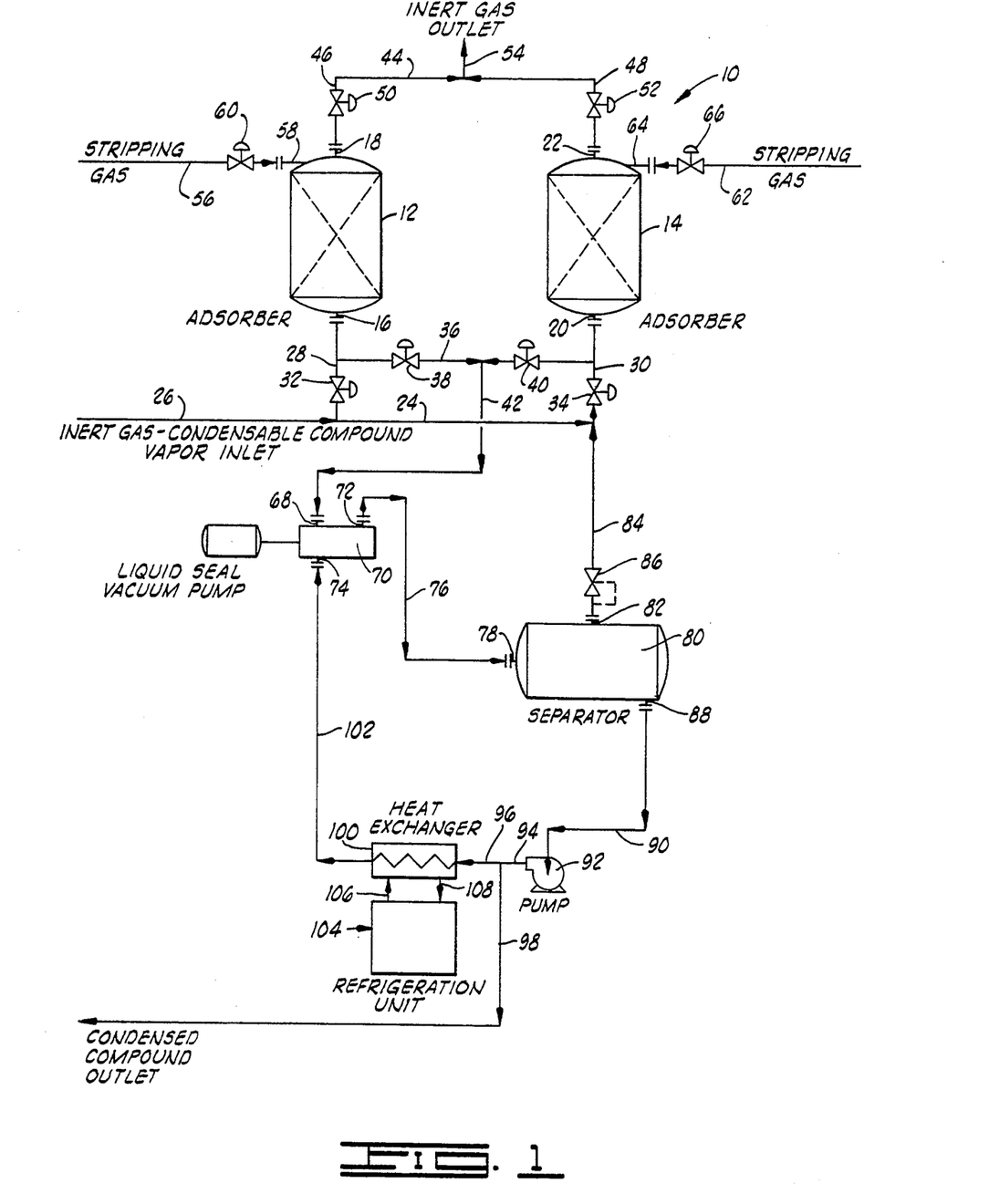
FIG. 1 is a schematic illustration of apparatus for carrying out the process of the present invention.

Referring now to the drawings, and particularly to FIG. 1, apparatus of this invention for carrying out the process of the invention is illustrated and generally designated by the numeral 10. The apparatus 10 is comprised of two adsorbers 12 and 14, each of which contains a bed of solid adsorbent. The adsorber 12 includes inlet and outlet connections 16 and 18, and the adsorber 14 includes inlet and outlet connections 20 and 22. While various solid adsorbents having affinities for the condensable compounds to be recovered can be utilized in the adsorbers 12 and 14, activated carbon is generally preferred in that it is particularly suitable for adsorbing most condensable compounds from inert gas-condensable compound mixtures and for vacuum regeneration.

An inert gas-condensable compound vapor mixture inlet header 24 is provided connected to a conduit 26 which conducts a mixture of inert gas and condensable compound vapor from a source thereof to the apparatus 10. The inlet vapor mixture can include a single condensable compound such as one of those mentioned above, or it can include two or more condensable compounds such as the hydrocarbon compounds making up gasoline or kerosene vapor and the like. A pair of conduits 28 and 30 are connected to the header 24 and to the connections 16 and 20 of the adsorbers 12 and 14, respectively. Conventional switching valves 32 and 34 are disposed in the conduits 28 and 30, respectively, and a header 36 is connected to the conduits 28 and 30 at points thereon between the switching valves 32 and 34 and the connections 16 and 20 of the adsorbers 12 and 14. A pair of switching valves 38 and 40 are disposed in the header 36 and a conduit 42 is connected to the header 36 at a point between the switching valves 38 and 40.

A residue gas header 44 is provided connected to a pair of conduits 46 and 48 which are in turn connected to the connections 18 and 22 of the adsorbers 12 and 14, respectively. Switching valves 50 and 52 are disposed in the conduits 46 and 48, respectively, and a conduit 54 is connected to the header 44 for venting substantially condensable compound-free inert gas to the atmosphere or for conducting it to a point of non-polluting use or disposal.

A conduit 56 connected to a source (not shown) of stripping inert gas, which can optionally be heated, is connected to a stripping inert gas inlet connection 58 in the adsorber 12. A switching valve 60 is disposed in the conduit 56. In a like manner, stripping inert gas is conducted to the adsorber 14 by a conduit 62 connected to a connection 64 in the adsorber 14. A switching valve 66 is disposed in the conduit 62.

The other end of the conduit 42 which is connected to the header 36 is connected to the suction connection 68 of a liquid seal vacuum pump 70. The liquid seal vacuum pump 70 includes a discharge connection 72 and a cooled seal liquid inlet connection 74 for returning cooled seal liquid thereto. A conduit 76 is connected to the discharge connection 72 of the liquid seal vacuum pump 70 and to the inlet connection 78 of a separator 80. The separator 80 is a two phase separator for separating condensed compound seal liquid and additional condensed compounds produced in the pump 70 from a residue gas stream comprised of inert gas and a minor portion of condensable compound vapor, all of which are conducted from the discharge of the liquid seal vacuum pump 70 to the separator 80 by the conduit 76. The separated residue gas stream exits the separator 80 by way of an outlet connection 82. A conduit 84 is connected between the connection 82 and the inert gas-condensable compound vapor inlet header 24. A back pressure regulator 86 is disposed in the conduit 84 for maintaining a desired pressure within the separator 80. The separator 80 also includes a condensed compound liquid outlet connection 88 to which a conduit 90 is connected. The other end of the conduit 90 is connected to the inlet connection of a pump 92, the discharge connection of which is connected to an outlet header 94. The header 94 is connected to a pair of conduits 96 and 98 which divide the liquid stream of condensed compounds withdrawn from the separator 80 and pumped by the pump 92 into first and second condensed compound streams. The first condensed compound stream is conducted by the conduit 96 to the inlet of a heat exchanger 100 wherein it is passed in heat exchange relationship with a cooling medium and is cooled. The stream of cooled condensed compounds exiting the heat exchanger 100 is conducted by a conduit 102 connected thereto to the cooled seal liquid inlet connection 74 of the liquid seal vacuum pump 70. That is, the stream of cooled condensed compounds from the heat exchanger 100 is recycled to the liquid seal vacuum pump 70 and is utilized as the cooled seal liquid therefor. The second condensed compound stream flows by way of the conduit 98 to storage facilities or the like. While the cooling medium utilized in the heat exchanger 100 can vary, it is generally a stream of chilled refrigerant produced by a mechanical refrigeration unit, generally designated by the numeral 104. The stream of chilled refrigerant is conducted to and from the heat exchanger 100 by conduits 106 and 108 connected to the refrigeration unit 104.

The switching valves 32, 34, 38, 40, 50, 52, 60 and 66 are preferably automatically operated valves which are controlled by a conventional cycle controller. The length of each cycle, i.e., the period of time between when the switching valves are operated can be controlled by a timer or other instrument sensing one or more variables in the operation of the apparatus 10, such as the degree of vacuum achieved in the adsorbent bed being regenerated, the composition of the residue gas stream being produced, etc. Conventional liquid level, flow dividing and other controls (not shown) are utilized in the apparatus 10 for controlling the liquid level in the separator 80, for dividing the stream of condensed compounds pumped by the pump 92 into first and second streams of desired flow rate, etc. Such controls and their use are well known to those skilled in the art.

OPERATION OF THE APPARATUS 10

In operation of the apparatus 10, the switching valves 32, 34, 38, 40, 50 and 52 are operated in a manner whereby the inlet air-condensable compound vapor mixture is caused to flow through one of the adsorbers 12 or 14 while the other of the adsorbers is being regenerated. For example, during a first cycle, the switching valve 32 is open and the switching valve 34 closed whereby the inlet inert gas-condensable compound vapor mixture flows into the adsorber 12 by way of the conduit 28, the switching valve 32 and the connection 16 of the adsorber 12. Because the switching valve 34 disposed in the conduit 30 is closed, the inlet inert gas-condensable compound vapor mixture is prevented from entering the adsorber 14. The switching valve 50 disposed in the conduit 46 is open and the switching valve 52 disposed in the conduit 48 is closed whereby the substantially condensable compound-free stream of inert gas produced in the adsorber 12 exits the adsorber 12 by way of the connection 18 thereof, the conduit 46 and the switching valve 50 and enters the header 44. From the header 44, the residue gas stream flows through the conduit 54 from where it is vented to the atmosphere or conducted to a non-polluting location of use or disposal. The switching valve 38 disposed in the header 36 is closed, and the switching valve 40 disposed therein is open whereby the adsorbent bed within the adsorber 14 is communicated by way of the conduit 42 with the liquid seal vacuum pump 70. The switching valve 66 disposed in the conduit 62 is initially closed, but as will be described hereinbelow is later opened.

During the first part of the cycle when the switching valves are in the mode described above, the inlet inert gas-condensable compound vapor mixture flows through the bed of adsorbent within the adsorber 12 whereby condensable compounds are adsorbed on the bed and removed from the mixture. The residue gas produced which is comprised of substantially condensable compound-free inert gas is vented or conducted to another location by the conduit 54 as indicated above. Simultaneously, the bed of adsorbent disposed within the adsorber 14 is evacuated by the liquid seal vacuum pump 70 whereby inert gas and condensable compounds are desorbed therefrom. A condensable compound rich inert gas-condensable compound vapor mixture is withdrawn from the adsorbent bed within the adsorber 14. That is, the inert gas-condensable compound vapor mixture withdrawn from the adsorber 14 flows through the connection 20 and the conduit 30 into the header 36, through the open switching valve 40 and through the conduit 42 connected to the header 36 to the inlet connection 68 of the liquid seal vacuum pump 70. Simultaneously, seal liquid comprised of a stream of condensed compounds flows into the vacuum pump 70 by way of the connection 74 thereof. That is, a first liquid stream of condensed compounds, which is a portion of the total stream of condensed compounds withdrawn from the separator 80, is conducted to the heat exchanger 100 by the conduit 96 wherein the stream of condensed compounds is cooled to a desired temperature. The cooled condensed compound stream is conducted by the conduit 102 to the vacuum pump 70.

The particular temperature to which the first stream of condensed compounds is cooled is that temperature which produces a condensed compound vapor pressure low enough whereby the first stream of condensed compounds can be utilized as seal liquid in the vacuum pump 70 and allow the vacuum pump 70 to achieve the required vacuum level within the adsorbent bed being evacuated to fully regenerate the bed. Further, the temperature of the first stream of condensed compounds must be low enough to condense a major portion of the condensable compound vapors in the inert gas-condensable compound vapor mixture being pumped by the liquid seal vacuum pump 70. Generally, the liquid stream of condensed components utilized as seal liquid must be cooled to a temperature in the range of from about $-20°$ F. to about $120°$ F. at a pressure in the range of from about atmospheric to 25 psig to achieve desired results. In most cases, the cooling medium exchanged with the stream of condensed compounds in the heat exchanger 100 must be of a temperature in the range of from about −40° F. to about 100° F. and therefore, the cooling medium is often a stream of refrigerant cooled by a mechanical refrigeration unit or the equivalent. As will be understood, however, other means may be utilized for providing the cooling medium to the heat exchanger 100.

The inert gas-condensable compound vapor mixture entering the vacuum pump 70 by way of the inlet connection 68 thereof is intimately contacted with the cooled liquid stream of condensed compounds used as seal liquid entering the vacuum pump 70 by way of the inlet connection 74 thereof. Such intimate contact combined with increasing pressure causes a major portion of the condensable compound vapor to be condensed as the vapor flows through the vacuum pump 70. Thus, a stream of condensed compounds and residue gas comprised of inert gas and a minor portion of condensable compound vapor exits the vacuum pump 70 by way of the discharge connection 72 thereof. The stream is conducted by the conduit 76 into the separator 80 by way of the inlet connection 78 thereof. While within the separator 80, the condensed compound liquid is separated from the residue gas stream. The condensed compounds are withdrawn from the separator 80 by way of the discharge connection 88, and the residue gas is withdrawn therefrom by way of the discharge connection 82. The residue gas stream from the separator 80, comprised of inert gas and a minor portion of condensable compound vapor, is conducted from the discharge connection 82 of the separator 80 by the conduit 84 to the inert gas-condensable compound vapor inlet header 24 wherein the residue gas stream mixes with the inlet mixture and the condensable compounds contained therein are adsorbed on the bed of adsorbent within the vessel 12. The back pressure regulator 86 is utilized, if required, to hold a pressure greater than atmospheric pressure on the separator 80 which is sometimes necessary to achieve the optimum recovery efficiency needed. As previously described, the condensed compounds from the bed of adsorbent being evacuated and the recycled condensed compounds used as seal liquid are withdrawn from the separator 80 by way of the outlet connection 88 thereof, the conduit 90 and the pump 92. The pump 92 pumps the condensed compounds into the header 94, and the condensed compounds are divided into a first stream of condensed compounds which flows by way of the conduit 96 to the heat exchanger 100 and is recycled as seal liquid to the vacuum pump 70 and a second stream of condensed compounds which flows by way of the conduit 98 to storage facilities or other location.

During the last part of the cycle, after a major portion of condensable compounds adsorbed on the bed of adsorbent within the adsorber 14 have been desorbed therefrom by operation of the liquid seal vacuum pump 72, the switching valve 66 in the conduit 62 is opened whereby a quantity of stripping gas flows by way of the conduit 62, the switching valve 66 and the connection 64 of the adsorber 14 into the adsorber 14. The stripping gas flows through the bed of adsorbent contained in the adsorber 14 and is withdrawn therefrom by the liquid seal vacuum pump 70 as previously described. The introduction of a quantity of stripping gas into the adsorbent bed contained within the adsorber being regenerated functions to strip additional condensable compounds from the bed which were not desorbed therefrom by vacuum pumping alone. The combination of initially evacuating the adsorber 14 by vacuum pumping and then stripping the adsorbent bed with inert gas brings about the regeneration of the adsorbent bed to a greater degree than is possible by vacuum pumping alone.

After the adsorbent bed within the adsorber 14 has been fully regenerated and the adsorbent bed within the adsorber 12 loaded with condensable compounds from the inert gas-condensable compound vapor mixture flowing therethrough, the switching valve 66 is closed, the switching valve 60 remains closed until the last part of the next cycle and the other switching valves of the apparatus 10 are reversed. That is, the switching valves 32 and 50 are closed, the switching valves 34 and 52 are opened, the switching valve 38 is opened and the switching valve 40 is closed. This causes the flow pattern of the inlet inert gas-condensable compound vapor mixture to be changed whereby the mixture flows through the regenerated adsorbent bed within the adsorber 14. The adsorbent bed within the adsorber 12 is simultaneously communicated with the liquid seal vacuum pump 70 whereby it is evacuated and the switching valve 60 is opened during a latter part of the cycle as described above to strip the adsorbent bed with inert gas, etc. As will be understood, the flow pattern of the inlet inert gas-condensable compound vapor mixture and the bed being regenerated are continuously changed or cycled whereby when the adsorbent bed through which the inlet vapor mixture is flowing becomes loaded with adsorbed condensable compounds, the inlet mixture is caused to flow into the bed which has just been regenerated. The inert gas-condensable compound vapor mixture produced from the bed being regenerated is continuously contacted with cooled condensed compound seal liquid within the vacuum pump 70 whereby a major portion of the condensable compounds in the vapor mixture is condensed and recovered. In addition, a stream of condensed compounds is continuously recycled from the separator 80 to the liquid seal vacuum pump 70.

The process of the present invention as carried out in the apparatus 10 and described above is particularly suitable for recovering vaporized condensable compounds mixed with inert gas produced as a result of filling storage tanks, loading transport vehicles, thermal expansion and the like.

Figure 2:
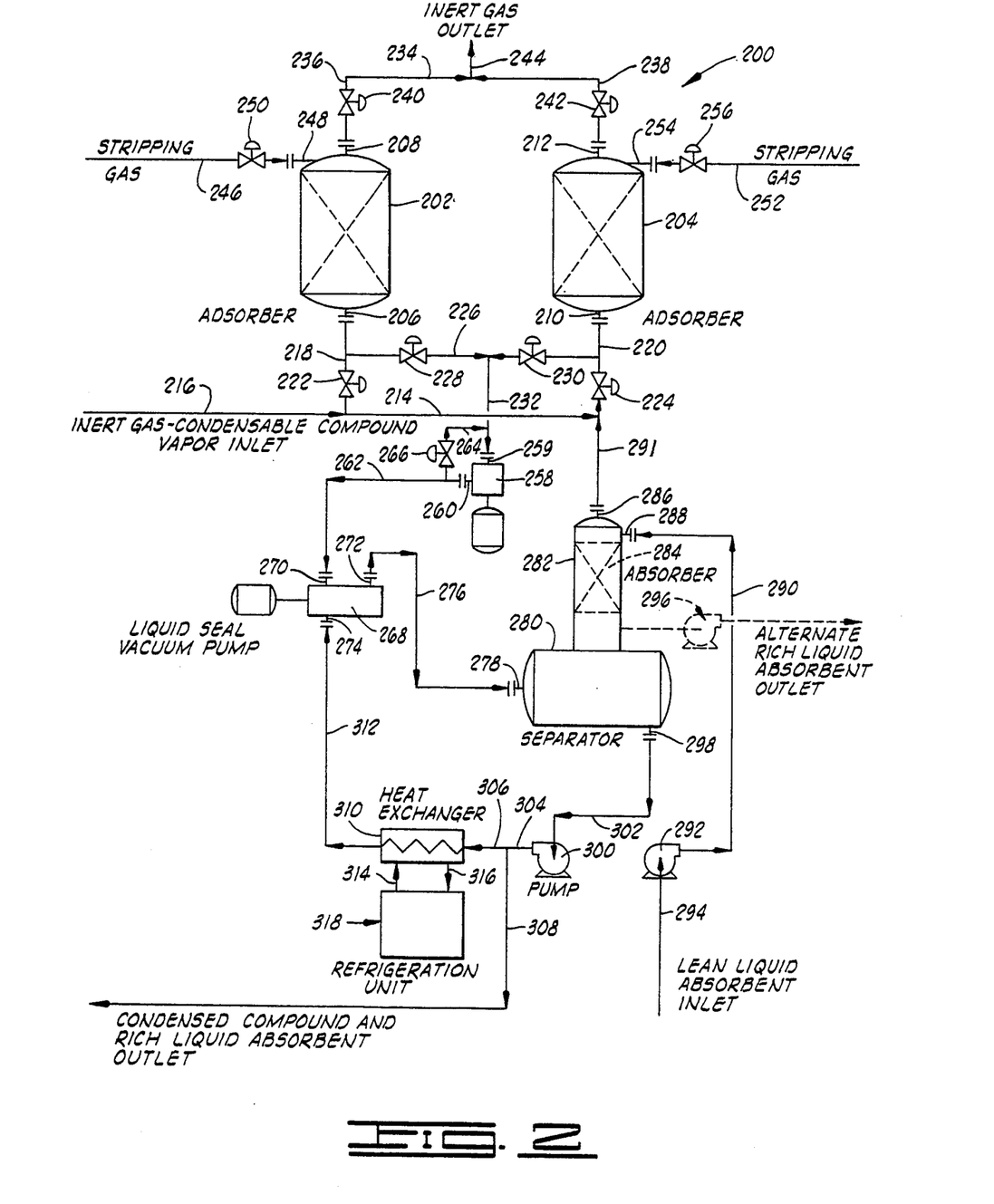
FIG. 2 is a schematic illustration of an alternate form of apparatus for carrying out the process of the present invention.

Referring now to FIG. 2, apparatus for carrying out an alternate form of the process of the present invention is illustrated and generally designated by the numeral 200. The apparatus 200 is identical to the apparatus 10 except that it includes a positive displacement vacuum booster pump connected upstream and in series with the cooled liquid seal vacuum pump and an absorber wherein condensable compound vapor is absorbed and removed from the vacuum pump residue vapor stream prior to its being combined with the inlet vapor mixture.

The use of the booster vacuum pump and/or the absorber are dictated by the particular condensable compound or compounds contained in the inlet vapor mixture and other factors such as the degree of removal of the condensable compounds from the residue inert gas exiting the adsorbers. Generally, an absorber is not used except where the cooling provided by the cooled seal liquid in the vacuum pump and the pressure to which the vacuum pump residue vapor is elevated are not sufficient by themselves to achieve the desired degree of condensable compound condensation. In those cases, an absorber utilizing a lean absorbent of lower vapor pressure than the condensable compounds is used.

The apparatus 200 is comprised of a pair of adsorbers 202 and 204, each of which contains a bed of solid adsorbent. The adsorber 202 includes inlet and outlet connections 206 and 208, and the adsorber 204 includes inlet and outlet connections 210 and 212. An inert gas-condensable compound vapor mixture inlet header 214 is provided connected to a conduit 216 which conducts a mixture of inert gas and condensable compound vapor from a source thereof to the apparatus 200. A pair of conduits 218 and 220 are connected to the header 214 and to the connections 206 and 210 of the adsorbers 202 and 204, respectively. Switching valves 222 and 224 are disposed in the conduits 218 and 220, respectively, and a header 226 is connected to the conduits 218 and 220. A pair of switching valves 228 and 230 are disposed in the header 226 and a conduit 232 is connected to the header 226 at a point between the switching valve 228 and 230.

A residue gas header 234 is provided, and a pair of conduits 236 and 238 are connected to the header 234 and to the connections 208 and 212 of the adsorbers 202 and 204, respectively. Switching valves 240 and 242 are disposed in the conduits 236 and 238, respectively, and a conduit 244 is connected to the header 234 for venting substantially condensable compound-free inert gas to the atmosphere or conducting it to a location of non-polluting use or disposal.

A conduit 246 connected to a source (not shown) of stripping gas, optionally heated, is connected to a stripping gas inlet connection 248 in the adsorber 202. A switching valve 250 is disposed in the conduit 246. In a like manner, stripping gas is conducted to the adsorber 204 by a conduit 252 connected to a connection 254 in the adsorber 204. A switching valve 256 is disposed in the conduit 252.

The other end of the conduit 232 connected to the header 226 is connected to the suction connection 259 of a positive displacement booster pump 258. The booster pump 258 is preferably a rotary blower of the lobed rotor design. The discharge connection 260 of the booster pump 258 is connected to a conduit 262. A spill-back conduit 264 is disposed around the booster pump 258 and is connected to the conduits 232 and 262. A switching valve 266 is disposed in the spill-back conduit 264.

A liquid seal vacuum pump 268 having a suction connection 270 to which the conduit 262 is attached, a discharge connection 272 and a seal liquid inlet connection 274 is provided. A conduit 276 is connected to the discharge connection 272 of the pump 268 and to an inlet connection 278 of a separator 280. As illustrated, an absorber 282 is integrally connected to the top of the separator 280. However, as will be understood, the separator 280 and absorber 282 can be separate vessels. Also, depending on design conditions, the apparatus 200 can include the booster pump 258 and not include the absorber 282, or vice versa.

The separator 280 is a two-phase separator capable of separating the stream of condensed compounds and residue gas comprised of inert gas and a minor portion of condensable compound vapor which exits the liquid seal vacuum pump 268 and enters the separator 280 into separate liquid and vapor streams. In addition, condensed compound-rich liquid absorbent from the absorber 282 enters the separator 280 by way of the open bottom of the absorber 282 connected to the top of the separator 280 which becomes a part of the separated liquid in the separator 280. The separated vapor component, i.e., the residue gas stream comprised of inert gas and a minor portion of condensable compound vapor passes upwardly from the separator 280 into and through the absorber 282 by way of the connection therebetween. The absorber 282 includes means disposed therein for bringing about intimate contact between a liquid absorbent flowing downwardly therein and a vapor mixture flowing upwardly. Preferably, the absorber 282 includes a section of packing material 284 disposed in the top portion thereof for bringing about such intimate contact. A residue gas outlet connection 286 and a lean liquid absorbent inlet connection 288 are provided above the packed section 284. Rich liquid absorbent produced in the absorber 282 flows downwardly through the packed section 284 and into the separator 280 as indicated above. The mixture of inert gas and condensable compound vapor separated in the separator 280 flows upwardly through the absorber into contact with the liquid absorbent flowing downwardly therein whereby condensable compounds are absorbed and removed from the vapor mixture and a residue gas stream comprised of inert gas and a very minor portion of condensable compounds is produced. That stream flows through the outlet connection 286 and is conducted to the inert gas-condensable compound vapor inlet header 214 by a conduit 291. A conduit 290 connected to the lean liquid absorbent inlet connection 288 of the absorber 282 conducts a stream of lean liquid absorbent from a pump 292 to within the absorber 282. A conduit 294 connected to the suction of the pump 292 conducts lean liquid absorbent from a source thereof (not shown) to the pump 292.

As will be described further hereinbelow, the lean liquid absorbent will have a lower vapor pressure than the condensable compound(s) but may contain one or more of the condensable compounds. For example, if the condensable compounds in the inlet gas mixture are gasoline light ends produced as a result of filling storage tanks, loading tank trucks, etc., the liquid absorbent utilized can be fresh gasoline pumped from a storage facility into the absorber 282. The fresh gasoline used as the lean absorbent, while containing the same light ends as the inlet gas mixture, also contains other heavier hydrocarbons which lowers its vapor pressure substantially below the vapor pressure of the condensed light ends. The rich liquid absorbent produced, i.e., the rich gasoline, flows into the separator 280 wherein it combines with condensed gasoline light ends in the separator 280. In some applications, however, it may be advantageous to utilize a chimney tray in the bottom of the absorber 282 (not shown) whereby the rich liquid absorbent is prevented from entering the separator 280, and to remove the rich liquid absorbent from the absorber by a separate pump and conduit system. Such a pump and conduit system are shown in dashed lines in FIG. 2 and are generally designated by the numeral 296.

The liquid separated in the separator 280 comprised of condensed compounds, recycled condensed compound seal liquid and rich liquid absorbent made up of and containing absorbed condensed compounds is withdrawn from the separator 280 by way of an outlet connection 298, a pump 300 and a conduit 302 connected therebetween. The discharge connection of the pump 300 is connected to a header 304 which is in turn connected to a pair of conduits 306 and 308.

In the same manner as described above relating to the apparatus 10, the stream of condensed compounds pumped by the pump 300 into the header 304 is divided into first and second condensed compound streams, the first stream flowing through the conduit 306 to a heat exchanger 310 and the second stream flowing by way of the conduit 308 to storage facilities or other location. As the first stream of condensed compounds flows through the heat exchanger 310 it is cooled by a cooling medium passed in heat exchange relationship therewith. The cooled stream of condensed compounds is conducted by a conduit 312 from the heat exchanger 310 to the seal liquid inlet connection 274 of the liquid seal vacuum pump 268 and is used as seal liquid therein as described above in connection with the apparatus 10. The cooling medium utilized in the heat exchanger 310 is conducted to and from the heat exchanger 310 by conduits 314 and 316, respectively, which are connected to a source of the cooling medium, e.g., a mechanical refrigeration unit 318.

OPERATION OF THE APPARATUS 200

The operation of the apparatus 200 is similar to the operation of the apparatus 10 described above except that the booster pump 258 is operated in conjunction with the liquid seal vacuum pump 268 to evacuate the bed of absorbent being regenerated. That is, the booster pump 258 operates continuously, but the switching valve 266 in the spill-back conduit 264 is open during the initial part of each cycle whereby the booster pump 258 is unloaded and the vacuum is created in the adsorber being evacuated by the liquid seal vacuum pump 268 alone. During a latter portion of the regeneration cycle, the switching valve 266 in the spill-back conduit is closed which loads the booster pump 258 causing a suction to be produced in addition to the suction produced by the liquid seal vacuum pump 268. The increased vacuum created by the booster pump causes additional condensable compounds to be desorbed from the bed.

As described above in connection with the apparatus 10, during the last part of the cycle, after a major portion of condensable compounds adsorbed on the bed of adsorbent being regenerated have been desorbed therefrom by the operation of the booster pump 258 and the liquid seal vacuum pump 268, the switching valve 250 or the switching valve 256 depending on which bed of absorbent is being regenerated is opened whereby the absorbent bed is stripped and additional condensable compounds are desorbed therefrom. Thus, the combination of initially evacuating the bed of adsorbent being regenerated by vacuum pumping with the liquid seal vacuum pump 268, further evacuating the adsorbent bed by loading the booster pump 258 and then stripping the adsorbent bed brings about the regeneration of the adsorbent bed to a greater degree than is possible by liquid seal vacuum pumping and stripping alone. This more complete regeneration of the bed increases the capacity of the bed to absorb additional condensable compounds, increases the overall condensable compound recovery efficiency and produces a condensable compound-free residue gas stream of lower condensable compound content.

As mentioned above, when the inlet vapor mixture is comprised of inert gas and volatile condensable compound(s) that are not sufficiently condensed at the temperature and pressure existing in the separator 280, and when it is advantageous to absorb such condensable compounds from the residue gas stream exiting the separator 280 to improve the efficiency of the process, the absorber 282 is utilized. The lean liquid absorbent pumped by the pump 292 into the absorber 282 by way of the conduit 290 and inlet connection 288 flows downwardly through the packed bed 284 and intimately contacts the residue gas stream flowing upwardly therethrough whereby condensable compounds are absorbed and removed therefrom. As described above, the resulting residue gas stream exiting the absorber 282 is conducted by the conduit 290 to the inlet gas and vapor mixture header 214. The rich liquid absorbent produced in the absorber 282 is either combined with the liquids in the separator 280 and removed therefrom or removed directly from the absorber 282 as previously described.

Because the improved process of this invention includes a continuous recycle stream of recovered condensed components as seal liquid in the liquid seal vacuum pump, the problems described above relating to seal liquid losses and contamination of recovered product are obviated. In addition, the improved process of this invention achieves very complete regeneration of the adsorbent and produces a residue inert gas stream containing a very low condensable compound content.

In order to further illustrate the process and operation of the apparatus of the present invention, the following example is given.

EXAMPLE

Methanol vapor and nitrogen gas are vented from a methanol storage tank as a result of filling the tank and/or thermal expansion within the tank. A vapor collection system is provided for causing the methanol vapor and nitrogen to flow to the apparatus 10 described herein. Pressure sensing devices connected to the storage tank sense the pressure within the storage tank and provide signals which are used to start and stop the apparatus 10. That is, a high pressure in the tank causes the apparatus 10 to start and a low pressure causes it to be shut down. The vapors are extracted from the storage tank by a blower (not shown) and the vapors flow through a condensate knock-out drum (not shown) prior to being conducted to the inert gas-condensable compound vapor inlet header 24 of the apparatus 10 by the conduit 26.

The beds of adsorbent in the adsorbers 12 and 14 are formed of activated carbon. The regeneration cycle of the carbon beds consists of reducing the pressure within the carbon bed being regenerated from atmospheric pressure to an absolute pressure of 1' of mercury (equivalent to approximately 29' of mercury vacuum at sea level) within a time period of about 15 minutes. A small volume of stripping gas is introduced into the activated carbon bed under conditions of high vacuum during the latter part of the cycle.

A stream of recovered liquid methanol chilled to approximately 40° F. within the heat exchanger 100 is conducted to the liquid seal vacuum pump 70 and is utilized as seal liquid therein. A majority of the methanol vapor extracted from the bed of activated carbon being regenerated is condensed while flowing through the vacuum pump 70 as a result of the presence of the cooled seal liquid and the increase in pressure. The residue gas stream conducted to a point of use or disposal by the conduit 54 is principally nitrogen containing a very minor amount of methanol. That is, the weight percent reduction in methanol between the inlet nitrogen-methanol vapor mixture conducted to the apparatus 10 by the conduit 26 and the nitrogen-methanol vapor mixture discharged by way of the conduit 54 is in the range of from about 98% to about 99.5% by weight.

Thus, the present invention is well adapted to carry out the objects and attain the ends and advantages mentioned as well as those which are inherent therein. While presently preferred embodiments of the invention have been described herein for purposes of this disclosure, numerous changes in the arrangement of process steps and apparatus elements may suggest themselves to those skilled in the art which changes are encompassed within the spirit of this invention as defined by the appended claims.

What is claimed is:

1. An improved process for recovering at least one condensable compound from an inlet inert gas-condensable compound vapor mixture comprising the steps of:
   (a) flowing said inlet mixture through a first bed of solid adsorbent having an affinity for said condensable compound so that said condensable compound is adsorbed on said bed and a residue gas stream comprised of substantially condensable compound-free inert gas is produced;
   (b) conducting said substantially condensable compound-free inert gas to a location of use or disposal;
   (c) evacuating a second bed of solid adsorbent having said condensable compound adsorbed thereon by subjecting said bed to pumping with a cooled liquid seal vacuum pump so that a major portion of said condensable compound is desorbed from said bed, a condensable compound rich inert gas-condensable compound vapor mixture is produced and a major portion of said condensable compound in said inert gas-condensable compound vapor mixture is condensed as a result of said vapor mixture being contacted with said cooled seal liquid in said liquid seal vacuum pump whereby a stream of condensed compound and residue gas comprised of inert gas and a minor portion of condensable compound vapor exit said pump;
   (d) separating said condensed compound and residue gas stream exiting said pump in accordance with step (c) into a residue gas stream and a condensed compound stream;
   (e) combining the separated residue gas stream of step (d) with said inlet inert gas-condensable compound mixture of step (a) whereby the condensable compound contained therein is adsorbed on said first bed of solid adsorbent;
   (f) dividing the separated condensed compound stream of step (d) into first and second streams of condensed compound;
   (g) passing said first stream of condensed compound in heat exchange relationship with a cooling medium so that said first stream of condensed compound is cooled to a temperature which produces a condensed compound vapor pressure low enough to evacuate said second bed of solid adsorbent in accordance with step (c) and causes a major portion of said condensable compound vapor to be condensed in accordance with step (c) when said first stream of condensed compound is used as seal liquid for said liquid seal vacuum pump;
   (h) recycling said cooled first stream of condensed compound of step (g) to said vacuum pump as cooled seal liquid therefor; and
   (i) periodically changing the flow pattern of said inlet inert gas-condensable compound mixture and changing the bed of solid adsorbent being evacuated so that when the bed through which the inlet inert gas-condensable compound mixture is flowing becomes loaded with adsorbed condensable compound, the inlet inert gas-condensable compound mixture is caused to flow through the bed which has just been evacuated.

2. The process of claim 1 wherein said inert gas is a gas from the group consisting of air and nitrogen and said condensable compound is a compound from the group consisting of methanol, benzene, toluene, methyl tertiary butyl ether, acetone, carbon tetrachloride and hexane.

3. The process of claim 1 which further comprises the step of introducing a quantity of condensable compound-free inert gas into said second bed while evacuating said bed so that additional condensable compound is stripped from said bed and additional inert gas-condensable compound mixture is produced.

4. The process of claim 3 wherein said condensable compound-free inert gas is heated prior to introducing it into said bed.

5. The process of claim 1 which further comprises the step of further evacuating said second bed by vacuum pumping with a positive displacement booster pump connected upstream and in series with said cooled liquid seal vacuum pump while continuing to pump with said cooled liquid seal vacuum pump whereby additional condensable compound is desorbed from said bed, additional inert gas-condensable compound vapor mixture is produced and additional condensable compound is condensed in accordance with step (c).

6. The process of claim 1 wherein said inlet inert gas-condensable compound vapor mixture contains two or more condensable compounds.

7. The process of claim 1 which further comprises the step of contacting said separated residue gas stream of step (d) with a lean liquid absorbent so that a portion of said condensable compound vapor is removed from said residue gas stream and a rich liquid absorbent is produced prior to combining said residue gas stream with said inlet inert gas-condensable compound mixture in accordance with step (e).

8. The process of claim 7 which further comprises the step of combining said rich liquid absorbent with the separated condensed compound stream of step (d).

9. The process of claim 1 wherein said first and second beds of solid adsorbent are beds of activated carbon.

10. The process of claim 1 wherein said cooling medium of step (g) is a chilled refrigerant stream.

11. An improved process for recovering at least one condensable compound from an inlet inert gas-condensable compound vapor mixture comprising the steps of:
   (a) flowing said inlet mixture through a first bed of solid adsorbent so that said condensable compound is adsorbed on said bed and a residue gas stream comprised of substantially condensable compound-free inert gas is produced;
   (b) conducting said substantially condensable compound-free inert gas to a location of use or disposal;
   (c) evacuating a second bed of solid adsorbent having said condensable compound adsorbed thereon by subjecting said bed to pumping with a cooled liquid seal vacuum pump so that a major portion of said condensable compound is desorbed from said bed, a condensable compound rich inert gas-condensable compound vapor mixture is produced and a major portion of said condensable compound in said inert gas-condensable compound vapor mixture is condensed as a result of said vapor mixture being contacted with said cooled seal liquid in said liquid seal vacuum pump whereby a stream of condensed compound and residue gas comprised of inert gas and a minor portion of condensable compound vapor exit said pump;

(d) further evacuating said second bed by vacuum pumping with a positive displacement booster pump connected upstream and in series with said cooled liquid seal vacuum pump while continuing to pump with said cooled liquid seal vacuum pump whereby additional condensable compound is desorbed from said bed, additional inert gas-condensable compound vapor mixture is produced and additional condensable compound is condensed;

(e) separating said stream of condensed compound and residue gas exiting said cooled liquid seal vacuum pump in accordance with step (c) into separate streams of condensed compound and residue gas;

(f) combining the separated residue gas stream of step (e) with said inlet inert gas-condensable compound mixture of step (a) whereby the condensable compound contained therein is adsorbed on said first bed of solid adsorbent;

(g) dividing the separated condensed compound stream of step (e) into first and second streams of condensed compound;

(h) passing said first stream of condensed compound in heat exchange relationship with a cooling medium so that said first stream of condensed compound is cooled to a temperature which produces a condensed compound vapor pressure low enough to evacuate said second bed of solid adsorbent in accordance with step (c) and causes a major portion of said condensable compound vapor to be condensed in accordance with step (c) when said first stream of condensed compound is used as seal liquid for said liquid seal vacuum pump;

(i) recycling said cooled first stream of condensed compound of step (h) to said vacuum pump as cooled seal liquid therefor; and (j) periodically changing the flow pattern of said inlet inert gas-condensable compound mixture and changing the bed of solid adsorbent being evacuated so that when the bed through which the inlet inert gas-condensable compound mixture is flowing becomes loaded with adsorbed condensable compound, the inlet inert gas-condensable compound mixture is caused to flow through the bed which has just been evacuated.

12. The process of claim 11 wherein said inert gas is a gas from the group consisting of air and nitrogen and said condensable compound is a compound from the group consisting of methanol, benzene, toluene, methyl tertiary butyl ether, acetone, carbon tetrachloride and hexane.

13. The process of claim 11 which further comprises the step of introducing a quantity of condensable compound-free inert gas into said second bed while evacuating said bed so that additional condensable compound is stripped from said bed and additional inert gas-condensable compound mixture is produced.

14. The process of claim 13 wherein said condensable compound-free inert gas is heated prior to being introduced into said bed.

15. An improved process for recovering condensable compounds from an inlet inert gas-condensable compound vapor mixture comprising the steps of:

(a) flowing said inlet mixture through a first bed of solid adsorbent so that said condensable compounds are adsorbed on said bed and a residue gas stream comprised of substantially condensable compound-free inert gas is produced;

(b) conducting said substantially condensable compound-free inert gas to a location of use or disposal;

(c) evacuating a second bed of solid adsorbent having said condensable compounds adsorbed thereon by subjecting said bed to pumping with a cooled liquid seal vacuum pump so that a major portion of said condensable compounds are desorbed from said bed, a condensable compound rich inert gas-condensable compound vapor mixture is produced and a major portion of said condensable compounds in said inert gas-condensable compound vapor mixture are condensed as a result of said vapor mixture being contacted with said cooled seal liquid in said liquid seal vacuum pump whereby a stream of condensed compounds and residue gas comprised of inert gas and a minor portion of condensable compound vapor exit said pump;

(d) further evacuating said second bed by vacuum pumping with a positive displacement booster pump connected upstream and in series with said cooled liquid seal vacuum pump while continuing to pump with said cooled liquid seal vacuum pump whereby additional condensable compounds are desorbed from said bed, additional inert gas-condensable compound vapor mixture is produced and additional condensable compounds are condensed;

(e) introducing a quantity of condensable compound-free inert gas into said second bed while evacuating said bed so that additional condensable compounds are stripped from said bed and additional inert gas-condensable compound mixture is produced;

(f) separating said stream of condensed compounds and residue gas exiting said cooled liquid seal vacuum pump in accordance with step (c) into separate streams of condensed compounds and residue gas;

(g) combining the residue gas stream of step (f) with said inlet inert gas-condensable compound mixture of step (a) whereby the condensable compounds contained therein are adsorbed on said first bed of solid adsorbent;

(h) dividing the separated condensed compound stream of step (f) into first and second streams of condensed compounds;

(i) passing said first stream of condensed compounds of step (h) in heat exchange relationship with a cooling medium so that said first stream of condensed compounds are cooled to a temperature which produces a condensed compound vapor pressure low enough to evacuate said second bed of solid adsorbent in accordance with step (c) and causes a major portion of said condensable compound vapor to be condensed in accordance with step (c) when said first stream of condensed compounds is used as seal liquid for said liquid seal vacuum pump;

(j) recycling said cooled first stream of condensed compounds of step (i) to said vacuum pump as cooled seal liquid therefor; and (k) periodically changing the flow pattern of said inlet inert gas-condensable compound mixture and changing the bed of solid adsorbent being evacuated so that when the bed through which the inlet inert gas-condensable compound mixture is flowing becomes loaded with adsorbed condensable compounds, the inlet inert gas-condensable compound mixture is caused to flow through the bed which has just been evacuated.

16. The process of claim 15 wherein said condensable compound-free inert gas is a gas from the group consisting of air and nitrogen and said condensable compounds are hydrocarbons.

17. The process of claim 15 which further comprises the step of contacting said residue gas stream separated in step (f) with a lean liquid absorbent so that a portion of said condensable compound vapor is removed from said residue gas stream and a rich liquid absorbent is produced prior to combining said residue gas stream with said inlet inert gas-condensable compound mixture in accordance with step (g).

18. The process of claim 17 which further comprises the step of combining said rich liquid absorbent with the separated condensed compound stream of step (f).

19. The process of claim 18 wherein said cooling medium of step (i) is a chilled refrigerant stream.

20. The process of claim 19 wherein said beds of solid adsorbent are beds of activated carbon.

21. A process for recovering a condensable material from an inlet gas mixture comprising said condensable material, said process comprising the steps of:

(a) flowing said inlet mixture through a bed of solid adsorbent having an affinity for said condensable material so that at least a portion of said condensable material is adsorbed on said bed;

(b) evacuating said bed having said condensable material adsorbed thereon by pumping with a liquid seal vacuum pump using a seal liquid so that (i) at least a portion of said condensable material adsorbed on said bed is desorbed therefrom, (ii) a gas mixture comprising an inert gas and said desorbed condensable material is produced, and (iii) at least a portion of said desorbed condensable material in said gas mixture is condensed as a result of said gas mixture being contacted with said seal liquid in said liquid seal vacuum pump;

(c) separating said material condensed in step (b) from said inert gas;

(d) employing at least a portion of said separated condensed material in said liquid seal vacuum pump as said seal liquid such that said seal liquid consists essentially of said portion of said separated condensed material; and (e) prior to step (d), cooling said portion of said separated condensed material used as said seal liquid such that (i) a seal liquid vapor pressure effective for evacuating said bed by pumping with said liquid seal vacuum pump in accordance with step (b) is obtained and (ii) said portion of said desorbed condensable material is condensed in accordance with step (b) when said gas mixture is contacted with said seal liquid in said liquid seal vacuum pump.

22. The process of claim 21 wherein said portion of said condensed material used as said seal liquid is cooled in step (e) by passing said portion of said condensed material in heat exchange relationship with a cooling medium.

23. The process of claim 22 wherein said cooling medium is a chilled refrigerant stream.

24. The process of claim 21 wherein said inert gas is air, nitrogen, or a mixture thereof.

25. The process of claim 21 wherein said condensable material comprises at least one hydrocarbon.

26. The process of claim 21 wherein said condensable material is gasoline vapor.

27. The process of claim 21 wherein said condensable material is kerosene vapor.

28. The process of claim 21 wherein said condensable material is selected from the group consisting of methanol, benzene, toluene, methyl tertiary butyl ether, acetone, carbon tetrachloride, and hexane.

* * * * *

UNITED STATES PATENT AND TRADEMARK OFFICE
CERTIFICATE OF CORRECTION

PATENT NO. : 5,345,771
DATED : September 13, 1994
INVENTOR(S) : Harold L. Dinsmore It is certified that error appears in the above-indentified patent and that said Letters Patent is hereby corrected as shown below:

Column 12, line 52, delete "1'" and substitute --1"-- therefor;

Column 12, line 53, delete "29'" and substitute --29"--.

Signed and Sealed this

Thirteenth Day of December, 1994

Attest:

BRUCE LEHMAN

*Attesting Officer*    *Commissioner of Patents and Trademarks*